(12) United States Patent
Wang et al.

(10) Patent No.: US 11,409,445 B2
(45) Date of Patent: Aug. 9, 2022

(54) METHOD, DEVICE, AND COMPUTER PROGRAM PRODUCT FOR MANAGING STORAGE SYSTEM

(71) Applicant: EMC IP Holding Company LLC, Hopkinton, MA (US)

(72) Inventors: Yi Wang, Chengdu (CN); Qingxiao Zheng, Chengdu (CN); Qianyun Cheng, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 59 days.

(21) Appl. No.: 17/122,260

(22) Filed: Dec. 15, 2020

(65) Prior Publication Data

US 2022/0137834 A1 May 5, 2022

(30) Foreign Application Priority Data

Oct. 30, 2020 (CN) .......................... 202011191707.7

(51) Int. Cl.
| G06F 12/00 | (2006.01) |
| G06F 3/06 | (2006.01) |
| G06F 11/14 | (2006.01) |

(52) U.S. Cl.
CPC ............ *G06F 3/0619* (2013.01); *G06F 3/064* (2013.01); *G06F 3/067* (2013.01); *G06F 3/0631* (2013.01); *G06F 3/0653* (2013.01); *G06F 11/1435* (2013.01); *G06F 11/1464* (2013.01)

(58) Field of Classification Search
CPC ...... G06F 3/0619; G06F 3/0631; G06F 3/064; G06F 3/0653; G06F 3/067; G06F 11/1435; G06F 11/1464
See application file for complete search history.

(56) References Cited

U.S. PATENT DOCUMENTS

| 6,269,382 B1 * | 7/2001 | Cabrera ................ G06F 16/122 |
| 9,852,149 B1 * | 12/2017 | Taylor ................. G06F 16/1844 |
| 2013/0151786 A1 * | 6/2013 | Huras ................. G06F 12/0891 |
| | | 711/135 |
| 2014/0006357 A1 * | 1/2014 | Davis ................. G06F 11/1446 |
| | | 707/667 |

(Continued)

*Primary Examiner* — John A Lane
(74) *Attorney, Agent, or Firm* — Womble Bond Dickinson (US) LLP

(57) ABSTRACT

Embodiments of the present disclosure relate to a method, an electronic device, and a computer program product for managing a storage system. A method for managing a storage system is provided. The method includes storing a data block to be backed up into a local storage device of the storage system; determining whether the data block includes periodically rewritten data based on historical operation information of the storage system, the historical operation information being associated with storage operations and removal operations by the storage system on historical data; and if it is determined that the data block does not include periodically rewritten data, storing the data block into a remote storage device of the storage system, and removing the data block from the local storage device. The embodiments of the present disclosure can prevent data from being rewritten to a local storage device for many times, thereby improving the performance of a storage system and prolonging the service life of the local storage device.

18 Claims, 9 Drawing Sheets

(56) References Cited

U.S. PATENT DOCUMENTS

| | | | |
|---|---|---|---|
| 2015/0067087 A1* | 3/2015 | Guerin | G06F 15/17331 709/212 |
| 2017/0235485 A1* | 8/2017 | Davis | G06F 3/0631 711/113 |
| 2020/0226066 A1* | 7/2020 | Shifer | G06F 11/3037 |

* cited by examiner

METHOD, DEVICE, AND COMPUTER PROGRAM PRODUCT FOR MANAGING STORAGE SYSTEM

CROSS-REFERENCE TO RELATED APPLICATION

This patent application claims priority, under 35 U.S.C. § 119, of Chinese Patent Application No. 202011191707.7, filed Oct. 30, 2020, which is incorporated by reference in its entirety.

TECHNICAL FIELD

Embodiments of the present disclosure generally relate to the field of data storage, and in particular, to a method, a device, and a computer program product for managing a backup storage system.

BACKGROUND

In a storage system, since the storage space is limited, data migration and backup are often required. For example, data to be backed up may be stored in a local storage device or may be stored in a remote storage device. The price of local storage devices is relatively high, the input/output (I/O) capability is good, and the data transmission speed is high. The cost of remote storage devices is lower than that of local storage devices, but the input/output (I/O) capability is poor and the data transmission speed is relatively low. As more and more users choose to use remote storage devices for data backup, how to use a remote storage device for data backup more effectively is an issue worthy of attention.

SUMMARY OF THE INVENTION

The embodiments of the present disclosure provide a method, a device, and a computer program product for managing a storage system.

In a first aspect of the present disclosure, a method for managing a storage system is provided. The method includes storing a data block to be backed up into a local storage device of the storage system; determining whether the data block includes periodically rewritten data based on historical operation information of the storage system, the historical operation information being associated with storage operations and removal operations by the storage system on historical data; and if it is determined that the data block does not include periodically rewritten data, storing the data block into a remote storage device of the storage system; and removing the data block from the local storage device.

In a second aspect of the present disclosure, an electronic device is provided. The electronic device includes at least one processing unit and at least one memory. The at least one memory is coupled to the at least one processing unit and stores instructions for execution by the at least one processing unit. The instructions, when executed by the at least one processing unit, cause the electronic device to perform actions including: storing a data block to be backed up into a local storage device of the storage system; determining whether the data block includes periodically rewritten data based on historical operation information of the storage system, the historical operation information being associated with storage operations and removal operations by the storage system on historical data; and if it is determined that the data block does not include periodically rewritten data, storing the data block into a remote storage device of the storage system; and removing the data block from the local storage device.

In a third aspect of the present disclosure, a computer program product is provided. The computer program product is tangibly stored in a non-transitory computer storage medium and includes machine-executable instructions. The machine-executable instructions, when executed by a device, cause this device to implement any step of the method described according to the first aspect of the present disclosure.

The Summary of the Invention section is provided in order to introduce the selection of concepts in a simplified form, which will be further described in the Detailed Description below. The Summary of the Invention section is not intended to identify key features or essential features of the present disclosure, nor is it intended to limit the scope of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same components.

The same or corresponding reference numerals in the various drawings represent the same or corresponding portions.

DETAILED DESCRIPTION

Figure 1:
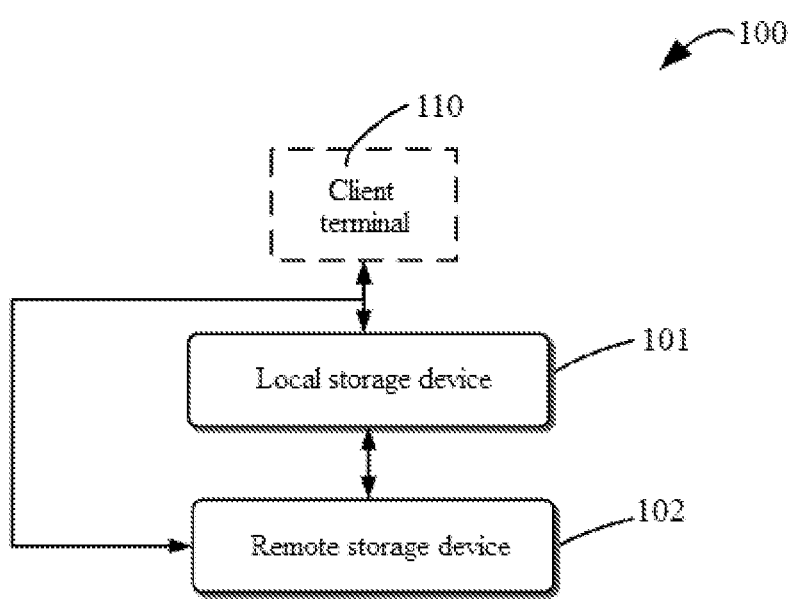
FIG. 1 shows a block diagram of an example environment in which embodiments of the present disclosure can be implemented.

Hereinafter, preferred embodiments of the present disclosure will be described in more detail with reference to the accompanying drawings. Although the preferred embodiments of the present disclosure are shown in the drawings, it should be understood that the present disclosure can be implemented in various forms and should not be limited by the embodiments set forth herein. Rather, these embodiments are provided so that the present disclosure will be more thorough and complete, and will fully convey the scope of the present disclosure to those skilled in the art.

As used herein, the term "including" and variations thereof mean open-ended inclusion, that is, "including but not limited to." Unless specifically stated, the term "or" means "and/or." The term "based on" means "based at least in part on." The terms "one example embodiment" and "one embodiment" mean "at least one example embodiment." The term "another embodiment" means "at least one further embodiment." The terms "first," "second," and the like may refer to different or identical objects. Other explicit and implicit definitions may also be included below.

FIG. 1 shows a schematic diagram of storage system 100 in which embodiments of the present disclosure may be implemented. Storage system 100 includes local storage device 101 and remote storage device 102 for storing data to be backed up. Local storage device 101, remote storage device 102, and client terminal 110 outside storage system 100 may communicate with each other through various communication protocols.

In some embodiments, examples of local storage device 101 may include, but are not limited to, hard disk devices, tape drives, optical drives, hard disk drives (HDD), solid state drives (SSD), redundant arrays of independent disks (RAID), or other hard disk devices. The price of local storage device 101 is usually relatively high, but the I/O capability is good, and the data transmission speed is high. In some embodiments, examples of remote storage device 102 may include, but are not limited to, a remote cloud storage device. The price of remote storage device 102 is generally lower than that of local storage device 102, but the I/O performance is relatively poor, and the data transmission speed is relatively low.

Due to the low price of remote storage device 102, more and more users choose to use remote storage device 102 for data backup. In conventional solutions, in order to solve the problem of relatively poor I/O performance of remote storage device 102, in the process of using remote storage device 102 for data backup, data to be backed up is usually first stored in local storage device 101, and then the data is stored from local storage device 101 to remote storage device 102.

In practical use, it is often necessary to repeatedly back up some data. Therefore, the above conventional solutions have encountered some problems in practical use. In such conventional solutions, data to be backed up is first stored in a local storage device and then transferred to a remote storage device, and the data is removed from the local storage device, so data that needs to be repeatedly backed up will be repeatedly stored in a local storage device for many times and repeatedly removed from the local storage device for many times. Such repeated rewriting of data in a local storage device has various disadvantages. For example, rewriting data repeatedly for many times will involve more I/O operations, and more I/O operations will affect the performance of data backup. In addition, with such conventional solutions, since a large amount of data will be repeatedly rewritten to the local storage device for many times, the service life of the local storage device will also be affected.

The embodiments of the present disclosure provide a solution for managing a storage system to solve one or more of the above problems and other potential problems. In this solution, a data block to be backed up is stored into a local storage device of a storage system. According to historical operation information stored in the storage system and about storage and removal operations for the data block in a historical operation process, it is determined whether the data block includes periodically rewritten data. If it is determined that the data block does not include periodically rewritten data, the data block is stored in a remote storage device of the storage system, and the data block is removed from the local storage device. If it is determined that the data block includes periodically rewritten data, the data block will not be stored in a remote storage device but will be retained in the local storage device.

In this way, it is possible to prevent data that has been repeatedly backed up for many times from being stored to and removed from the local storage device for many times. In this way, a large amount of I/O operations of the storage system can be reduced, so the performance of the storage system can be improved, and data can be backed up more effectively. In addition, since data is prevented from being stored in the local storage device for many times and removed from the local storage device for many times, the service life of the local storage device can be prolonged, and the cost can be reduced.

Figure 2:
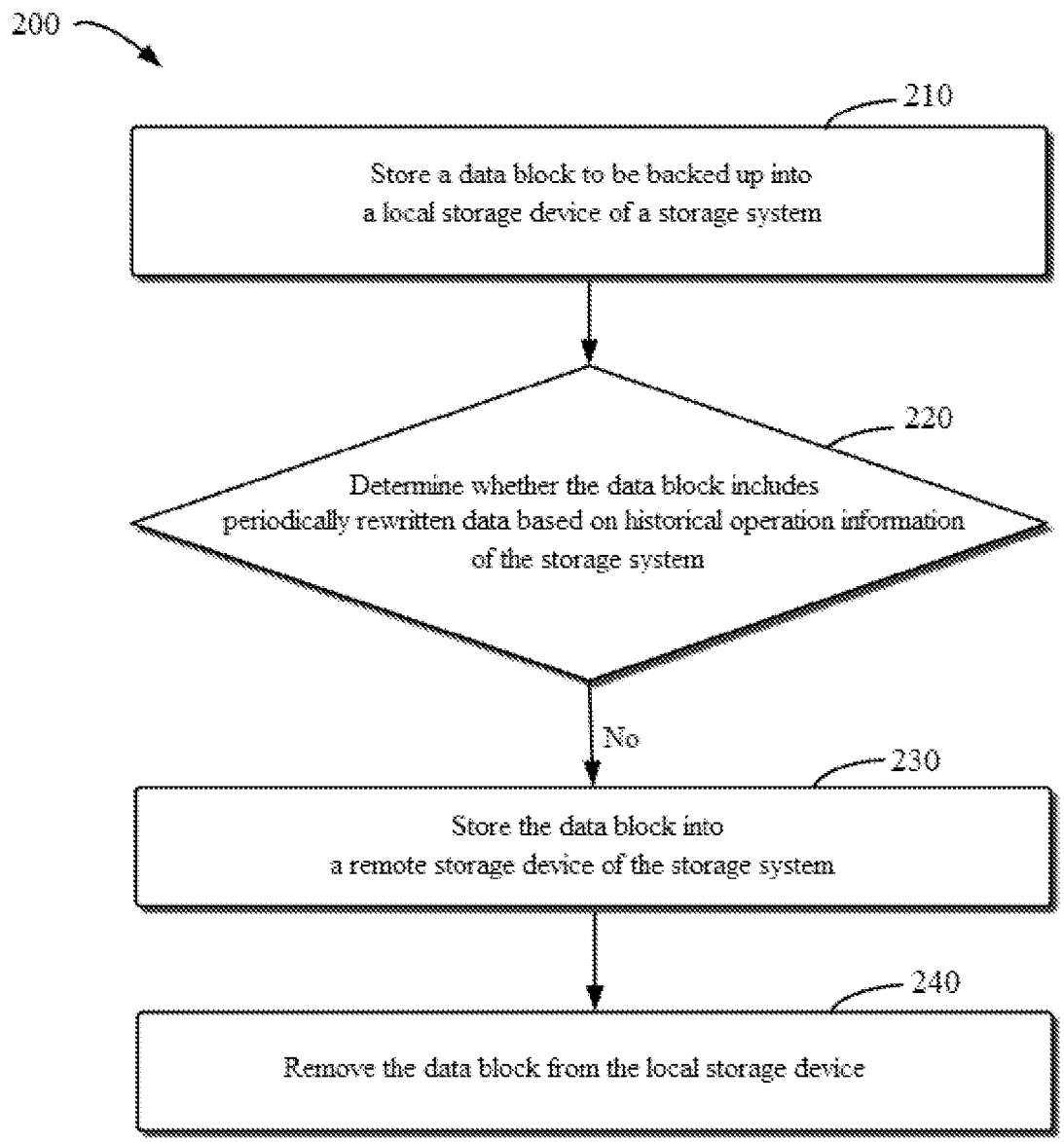
FIG. 2 shows a flowchart of an example method for storing data to be backed up according to some embodiments of the present disclosure.

The embodiments of the present disclosure will be described in detail below with reference to the accompanying drawings. FIG. 2 shows a flowchart of example method 200 for managing storage system 100 according to some embodiments of the present disclosure. Method 200 may be, for example, performed by storage system 100 as shown in FIG. 1. It should be understood that method 200 may further include additional actions not shown and/or may omit actions shown, and the scope of the present disclosure is not limited in this regard. Method 200 is described in detail below with reference to FIG. 1.

As shown in FIG. 2, at 210, a data block to be backed up is stored into local storage device 101 of storage system 100. For example, a data block received from client terminal 110 is stored into local storage device 101. Next, at 220, based on historical operation information of storage system 100, it is determined whether the data block includes periodically rewritten data. According to the embodiments of the present disclosure, the historical operation information is associated with storage operations and removal operations by storage system 100 on historical data. For example, the historical operation information may include a plurality of records. Each record corresponds to a hash value of the data block, and records information about storage and removal operations for the data block having the hash value, such as the number of times that the data block is stored and deleted, and the time when the data block is stored and deleted.

Figure 3:
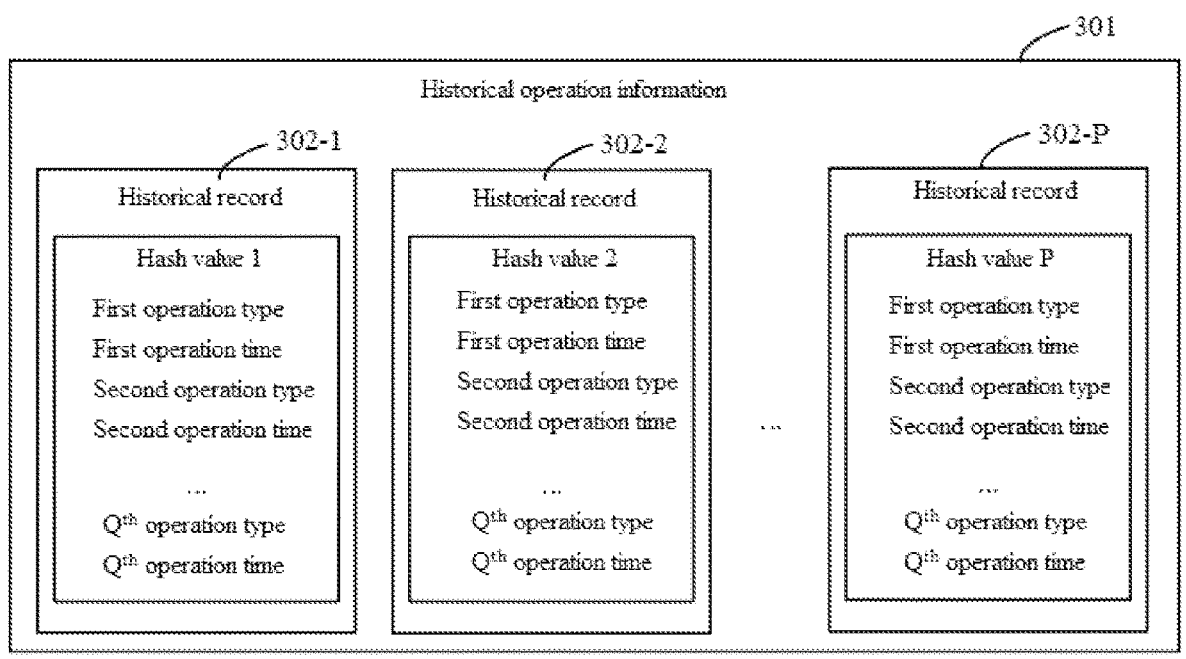
FIG. 3 shows a schematic diagram of historical operation information in a storage system according to some embodiments of the present disclosure.

FIG. 3 shows a schematic diagram of historical operation information 301 in storage system 100 according to some embodiments of the present disclosure. As shown in FIG. 3, historical operation information 301 may include a plurality of records for recording historical operations by storage system 100 on a plurality of data blocks. In an example of FIG. 3, historical operation information 301 may include historical records 302-1, 302-2, . . . , 302-P (collectively or individually referred to as "historical record 302"). P may be any natural number, but this is merely illustrative and does not limit the present invention in any way.

As shown in FIG. 3, historical record 302-1 in historical operation information 301 stores hash value 1 corresponding to historical record 302-1, and a historical operation type and time of a data block corresponding to hash value 1. The operation type includes a storage operation and a removal operation. Historical record 302 in historical operation information 301 is made corresponding to data blocks by the hash values. Historical record 302 may store the types and time of a plurality of operations. For example, as shown in FIG. 3, historical records 302-1, 302-2, . . . , 302-P may store the types and time of the first operation, the second operation, . . . , the Qth operation. Q may be any natural number, but this is merely illustrative and does not limit the present invention in any way. It can be understood that each historical record 302 may store different numbers of times of historical operations. The operation type may include a storage operation and a removal operation.

Figure 4:
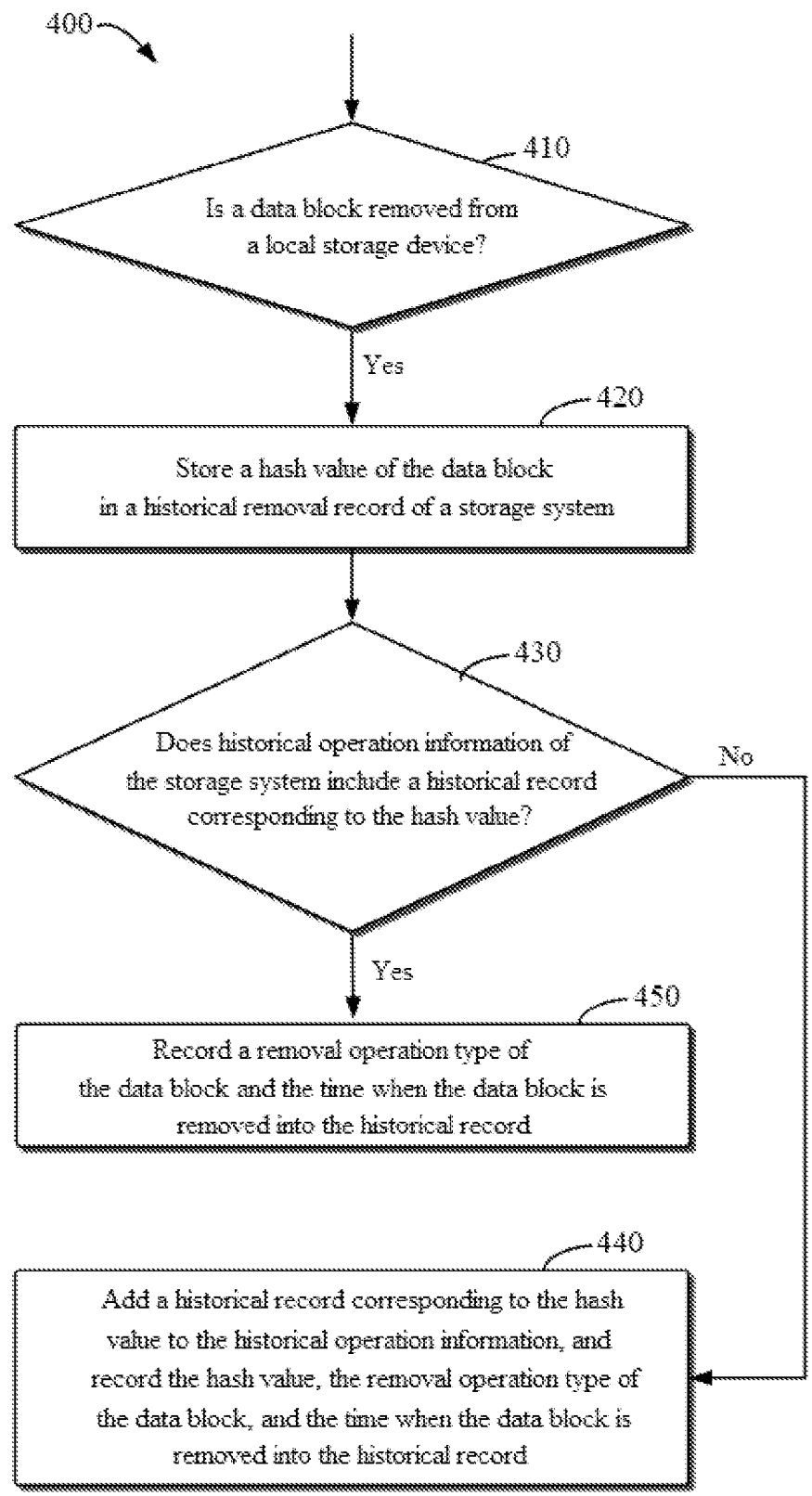
FIG. 4 shows a flowchart of an example method for updating historical operation information of a storage system according to some embodiments of the present disclosure.
Figure 5:
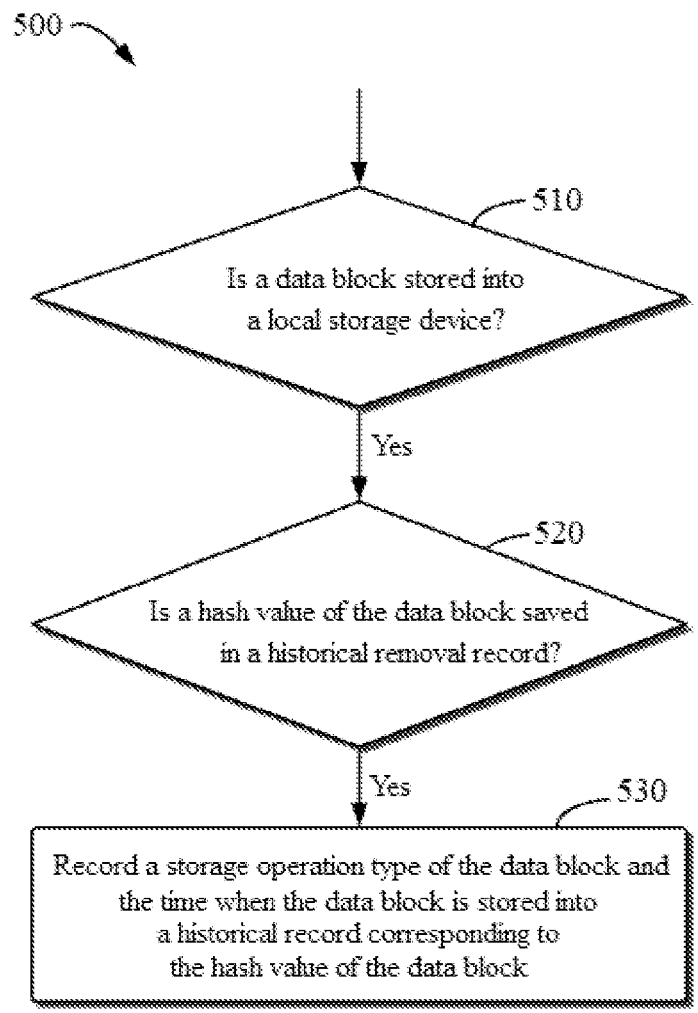
FIG. 5 shows a flowchart of an example method for updating historical operation information of a storage system according to some embodiments of the present disclosure.

In some embodiments, methods 400 and 500 shown in FIGS. 4-5 may be used to update historical operation information 301. For example, the first operation type and the first operation time may be an operation type of a removal operation and the time of the removal operation recorded by method 400 shown in FIG. 4; and the second operation type and the second operation time may be an operation type of a storage operation and the time of the storage operation recorded by method 500 shown in FIG. 5. The update process of historical operation information 301 will be described in detail below in conjunction with FIGS. 4-5.

Still refer to FIG. 2. In some embodiments, at 220, it may be directly determined based on historical operation information whether the data block includes periodically rewritten data. For example, if a record corresponding to the hash value of the data block indicates that the number of times that the data block is removed and subsequently stored exceeds a threshold count, that is, the number of times that the data block is rewritten exceeds the threshold number of times, it may be determined that the data block includes periodically rewritten data. The threshold number of times may be any designated number of times.

In some embodiments, at 220, a neural network model may be used to determine whether the data block includes periodically rewritten data. Such embodiment will be described in detail below with reference to FIG. 6.

If it is determined at 220 that the data block does not include periodically rewritten data, method 200 proceeds to 230. At 230, the data block is stored into remote storage device 102 of storage system 100. For example, the data block is stored into a remote cloud storage platform. In addition, at 240, the data block is also removed from local storage device 101.

It can be seen from the above description that, with the solution of managing a storage system proposed here, it is possible to prevent data that is repeatedly backed up for many times from being stored to the local storage device for many times and removed from the local storage device for many times. In this way, a large number of I/O operations of the storage system can be reduced, so the performance of the storage system can be improved, and data can be backed up more effectively. In addition, since data is prevented from being stored in the local storage device for many times and removed from the local storage device for many times, the service life of the local storage device can be prolonged, and the cost can be reduced. In addition, since the I/O operation performance of a remote storage device is relatively poor and its data read and write efficiency is low, with the solution of managing a storage system proposed here, data that is repeatedly backed up for many times is prevented from being stored to a remote storage device, and the data is stored into a local storage device with better I/O operation performance and high data read and write efficiency instead, which can further improve the data backup efficiency of the storage system and can improve the performance of the storage system.

On the other hand, since the data block including periodically rewritten data is not stored into remote storage device 102, the storage space of remote storage device 102 can be further saved, and the I/O operations between local storage device 101 and remote storage device 102 can be further reduced.

Method 200 for managing a storage system and historical operation information 301 in storage system 100 are described above. In some embodiments, the historical operation information used at 220, that is, historical operation information 301 shown in FIG. 3, may also be updated. FIG. 4 shows a flowchart of example method 400 for updating historical operation information of storage system 100 according to some embodiments of the present disclosure.

As shown in FIG. 4, at 410, it is determined whether the data block has been removed from local storage device 101. For example, if 240 in FIG. 2 has been completed, it indicates that the data block has been removed from local storage device 101. If it is determined that the data block has been removed from local storage device 101, method 400 proceeds to 420. At 420, a hash value of the data block is stored into a historical removal record in storage system 100. The historical removal record is associated with removal operations for the data block. For example, the historical removal record may store hash values of data blocks that have been removed from local storage device 101.

Next, at 430, it is determined whether the historical operation information of storage system 100 includes a historical record corresponding to the hash value of the data block. For example, the historical record in the historical operation information may store the hash value of the data block, and may also store the removal operation for the data block and the time when the data block is removed. If it is determined that the historical operation information does not include a historical record corresponding to the hash value, the method proceeds to 440. At 440, a historical record corresponding to the hash value is added to the historical operation information. For example, the hash value of the data block, a removal operation type, and the time when the data block is removed are recorded in the historical record. In some embodiments, if it is determined that the historical operation information includes a historical record corresponding to the hash value, method 400 proceeds to 450. At 450, a removal operation type of the data block and the time when the data block is removed are recorded in the historical record.

Alternatively or additionally, other methods may also be used to update the historical operation information. FIG. 5 shows a flowchart of an example method for updating historical operation information of storage system 100 according to some embodiments of the present disclosure.

As shown in FIG. 5, at 510, it is determined whether the data block is stored in local storage device 101. For example, it is determined whether 210 in FIG. 2 has been performed. If it is determined that the data block has been stored into local storage device 101, the method proceeds to 520. At 520, it is determined whether the hash value of the data block is stored in a historical removal record of storage system 100. For example, a historical removal record at 420 in FIG. 4 is searched for whether the historical removal record includes the hash value of the data block.

If it is determined that the hash value has been stored in the historical removal record of storage system 100, the method proceeds to 530. At 530, a storage operation type of the data block and the time when the data block is stored are recorded in a historical record, corresponding to the hash value, in the historical operation information of storage system 100. For example, a historical record corresponding to the hash value is searched for from the historical operation information, and the storage operation type of the data block and the time when the data block is stored are recorded in the historical record.

Figure 6:
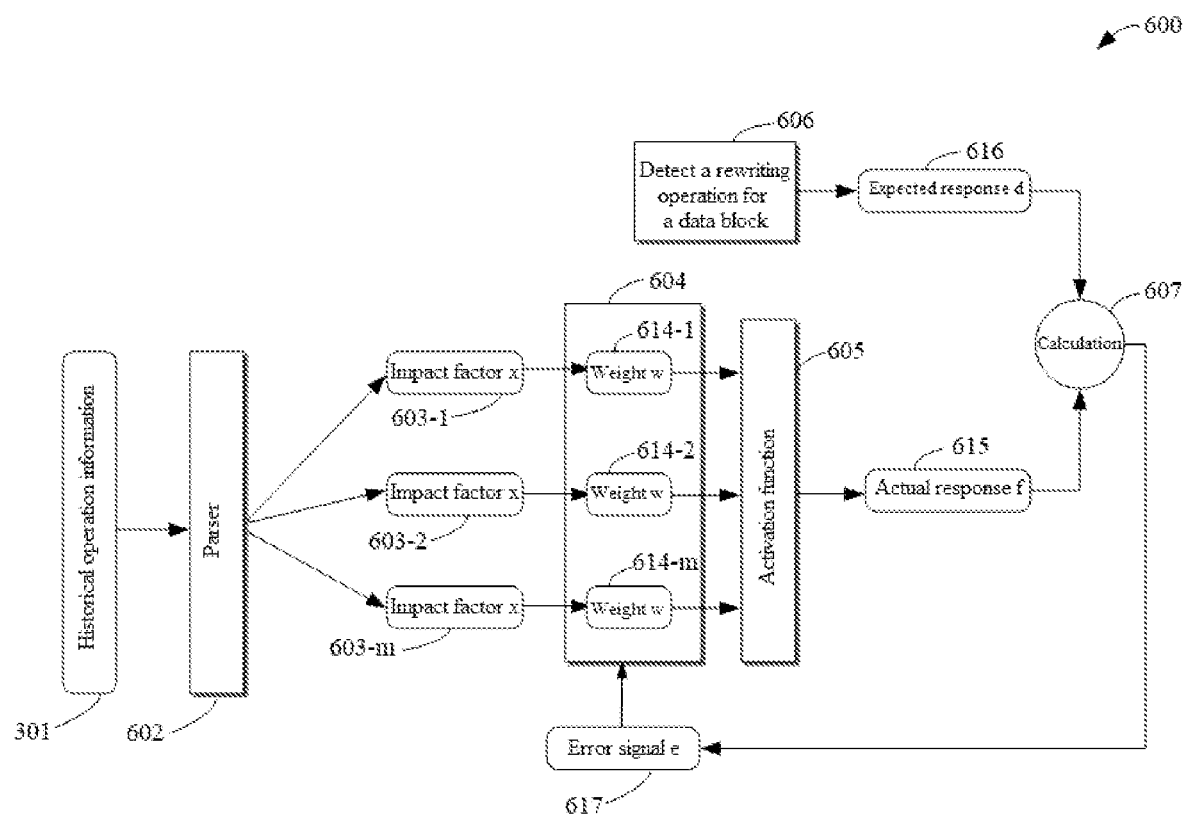
FIG. 6 shows a schematic diagram of determining, using a neural network model, rewriting of historical data corresponding to a data block according to some embodiments of the present disclosure.

FIG. 6 shows a schematic diagram of determining whether a data block includes periodically rewritten historical data using neural network model 600 according to some embodiments of the present disclosure. In some embodiments, an instruction associated with rewriting of historical data corresponding to the data block may be determined through historical operation information 301 as shown in FIG. 3 and using neural network model 600. The rewriting includes a storage operation and a removal operation. If the instruction determined using neural network model 600 exceeds a certain threshold, it may indicate that the data block includes periodically rewritten data. Conversely, if the determined instruction does not exceed the threshold, it indicates that the data block does not include periodically rewritten data. In this way, it is possible to predict whether a data block is a periodically rewritten data block through historical operation information 301 in storage system 100, thereby avoiding repeated rewriting of the periodically rewritten data block into local storage device 101, reducing I/O operations, and prolonging the service life of local storage device 101. This process will be described in more detail below in conjunction with FIG. 6.

As shown in FIG. 6, historical operation data 301 in storage system 100 is first analyzed using parser 602 to obtain an analysis result, namely, impact factors 603-1, 603-2, ..., 603-$m$ (collectively or individually referred to as "impact factor 603"), wherein m may be any natural number, but this is merely illustrative and does not limit the present invention in any way. In some embodiments, historical record 302 in historical operation information 301 may be analyzed using parser 602. Impact factor 603 may be calculated by an operation type and operation time information recorded in historical record 302.

In some embodiments, impact factor 603 may include the number of times that the data block corresponding to historical record 302 in historical operation data 301 is repeatedly removed and stored. For example, the number of times that the data block is repeatedly removed and stored may be calculated by counting a total number of removal operation types and a total number of storage operation types recorded in historical record 302. Alternatively or additionally, impact factor 603 may include the frequency at which the data block corresponding to historical record 302 in historical operation data 301 is repeatedly removed and stored. For example, the frequency at which the data block is repeatedly removed and stored may be calculated by removal operation time and storage operation time recorded in historical record 302. Alternatively or additionally, impact factor 603 may also include a variance of time intervals at which the data block corresponding to historical record 302 in historical operation data 301 is repeatedly rewritten. The rewriting time intervals refer to time intervals between the time when the data block is removed from historical record 302 and the time when the data block is first stored after the removal time. Alternatively or additionally, impact factor 603 may also include an average time interval of the time intervals at which the data block corresponding to historical record 302 in historical operation data 301 is repeatedly rewritten. It should be understood that, in some embodiments, alternatively or additionally, other data may also be selected as impact factor 603.

Returning to FIG. 6, FIG. 6 also shows weighting module 604 of neural network model 600. Impact factors 603 obtained by parser 602 are respectively weighted by weighting module 604. For example, as shown in the figure, weight 614-1 is applied to impact factor 603-1, ..., weight 614-M is applied to impact factor 603-$m$ (weights 614-1 ... 614-$m$ are collectively or individually referred to as "weight 614"). m is any natural number, but this is merely illustrative and does not limit the present invention in any way. For example, impact factor 603-1 may represent the number of times that the data block is repeatedly removed and stored, that is, the number of times that the data block is rewritten. Impact factor 603-2 may represent the frequency at which the data block is rewritten, etc.

In some embodiments, weight 614 may be changed. As shown in FIG. 6, weighting module 604 may receive error signal 617 and adjust weight 614 according to error signal 617. Error signal 617 will be described in more detail below.

After weighting impact factor 603, the weighted impact factor is input to activation function module 605 for calculation, activation function module 605 outputs actual response 615, and actual response 615 represents an actual output value of neural network model 600. In some embodiments, actual response 615 may serve as an instruction associated with the rewriting of historical data corresponding to the data block.

In some embodiments, an activation function may be, for example, the following formula (1). It should be understood that other activation functions may be used to calculate actual response 615.

$$f(z(i)) = \frac{1}{1+e^{-z(i)}} = \frac{1}{1+e^{(-b-\sum_{k=1}^{m}w_k(i)\times x_k(i))}} \quad \text{(i))}$$

In formula (1), i represents the ith calculation performed by neural network model 600, i may be any natural number, $w_k(i)$ represents weight 614 of the ith calculation for the kth impact factor 603, $x_k(i)$ represents impact factor 603 of the ith calculation, k=1, 2, ..., m represents that there may be m impact factors 603 and m weights 614, and f(z(i)) represents actual response 615.

In some embodiments, for historical record 302 in historical operation information 301, a value f(z(i)) calculated by the above formula (1) is a value greater than 0 and less than 1. The closer the value is to 1, the more likely a data block corresponding to historical record 302 is to be rewritten. The closer the value is to 0, the less likely the data block is to be rewritten. With this value, it may be predicted whether the data block is a periodically rewritten data block.

In some embodiments, there is also monitoring module 606 to monitor an actual data block rewriting operation. For example, test data of a laboratory or actual historical data of a client may be monitored to obtain a real result of the data block rewriting operation, that is, expected response 616. For example, expected response 616 may be represented by a value of 1 and 0, 1 means being a periodically rewritten data block, and 0 means not being a periodically rewritten data block.

By monitoring the real rewriting operation for the data block, expected response 616 and actual response 615 that is calculated by activation function 605 are used for comparison calculation to obtain error signal 617. In some embodiments, error signal 617 is calculated using the following formula (2).

$$e(z(i))=d(z(i))-f(z(i)) \quad (2)$$

In formula (2), f(z(i)) represents actual response 615 of the ith calculation, d(z(i)) represents the ith expected response 616, and e(z(i)) represents error signal 617 of the ith calculation. f(z(i)) is a number between 0 and 1, and d(z(i)) is a value of 1 or 0, so e(z(i)) calculated by formula (2) is a value between 0 and 1.

In some embodiments, as described above, error signal 617 is used to adjust weight 614 in weighting module 604 to train neural network model 600. For example, the following formulas (3)-(5) may be used to train neural network model 600 using a steepest descent method to obtain updated weight 614. It should be understood that other calculation methods may also be used to train neural network model 600. The training method for neural network model 600 will be introduced in more detail below in conjunction with formulas (3)-(5).

$$E(W)=\tfrac{1}{2}\Sigma_{i=1}^{N}e^{2}(z(i))=\tfrac{1}{2}\Sigma_{i=1}^{N}(d(z(i))-f(z(i)))^{2} \quad (3)$$

Formula (3) shows a cost function E(W) of weight 614, and W represents weight 614. N represents that there are N samples, and N may be any natural number, but this is merely illustrative and not intended to limit the present invention. For example, N samples may be N different data blocks. Formula (3) is used to calculate error signal 617 e(z(i)) obtained by calculating N samples to obtain cost E(W).

Next, a partial derivative is calculated for cost function E(W) by formula (4):

$$g=\frac{\partial E(W)}{\partial W}= \quad (4)$$

$$\frac{\partial}{\partial W}\left(\frac{1}{2}\sum_{i=1}^{N}(d(z(i))-f(z(i)))^{2}\right)=-\sum_{i=1}^{N}e(z(i))f(z(i))(1-f(z(i)))$$

Next, the following formula (5) is used to obtain trained updated weight 614.

$$W(i+1)=W(i)-ng(i)=W(i)+n\Sigma_{i=1}^{N}e(z(i))f(z(i))(1-f(z(i))) \quad (5)$$

In formula (5), g(i) represents a partial derivative of cost function E(W) of the ith training, W(i) represents a weight of the ith training, n is a preset step length, n may be any value. For example, n may be 1 or 0.5, but this is merely illustrative and does not limit the present invention in any way. W(i+1) represents updated weight 614 used in the next training.

In some embodiments, the above training process is repeated until the value of cost function E (W) is small enough, for example, smaller than a certain preset threshold. The value of cost function E(W) is small enough, indicating that neural network model 600 has been trained. Trained neural network model 600 may be used to analyze a data block in storage system 100, and can accurately predict whether the data block is a periodically rewritten data block.

Figure 7:
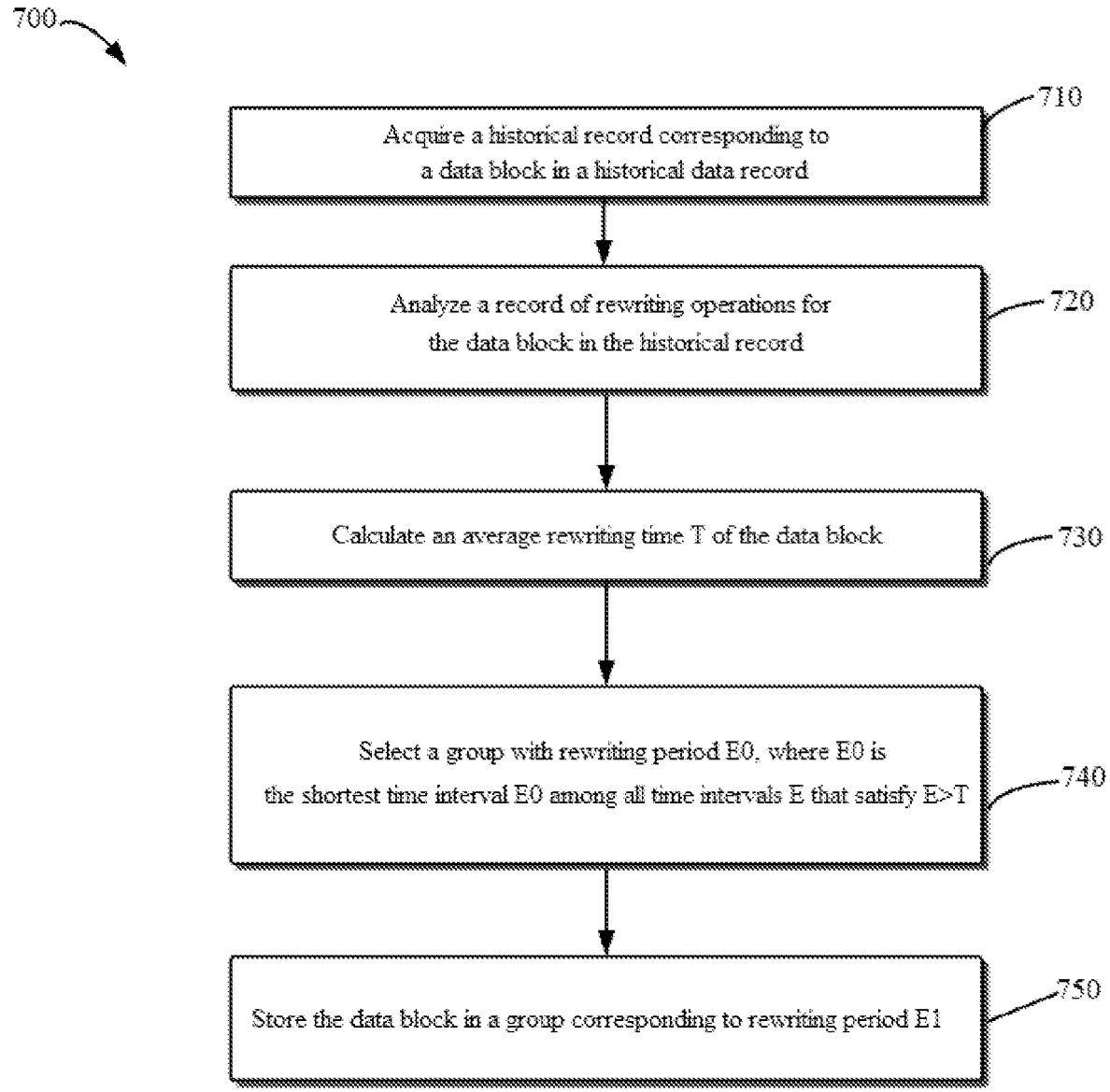
FIG. 7 shows a schematic diagram of grouping data according to a rewriting period of the data according to some embodiments of the present disclosure.

FIG. 7 shows a schematic diagram of grouping data according to a rewriting period of the data according to some embodiments of the present disclosure. In some embodiments, different data blocks in storage system 100 may have different rewriting periods T. For example, the rewriting period may be any time interval such as one day, one week, or one month. In storage system 100, different data blocks may be grouped according to the rewriting periods T. For example, data blocks that are rewritten every month may be divided into group E1, data blocks that are rewritten every week may be divided into group E2, data blocks that are rewritten every day may be divided into group E3, or data blocks may be divided into other groups according to other time intervals. The grouping process of data blocks will be described in detail below in conjunction with FIG. 7.

At 710, historical record 302 corresponding to a data block in historical data record 301 is acquired. Next, at 720, a record of a rewriting operation for the data block in historical record 302 is analyzed. For example, an operation type and operation time of each operation shown in FIG. 3 in the acquired historical record 302 are analyzed.

At 730, an average rewriting time T of the data block is calculated according to the operation type and operation time of each operation shown in FIG. 3 in historical record 302 acquired at 720. The rewriting time is a time interval between the time of a removal operation and the time of the first storage operation after the removal operation. For example, the first operation time in historical record 302 may represent time when the data block is removed for the first time, and the second operation time in historical record 302 may represent time when the data block is first stored after being removed for the first time. The first operation time may be subtracted from the second operation time in historical record 302 to obtain a time interval at which the data block is rewritten once. Through similar calculations, multiple rewriting time intervals of the data block may be obtained, and the average rewriting time T of the data block may be obtained by averaging the multiple rewriting time intervals.

Next, at 740, a group with rewriting period E0 is selected according to the average rewriting time T of the data block. E0 is the shortest time interval E0 among all time intervals e that satisfy E>T. For example, the average rewriting time T of the data block may be three days. As mentioned above, group E1 may represent a group with a rewriting period of one month, group E2 may represent a group with a rewriting period of one week, and group E3 may represent a group with a rewriting period of one day. Since the average rewriting time T is three days, groups satisfying E>T include group E1 and group E2. In group E1 and group E2, group E2 has the shortest time interval. Therefore, group E2 may be selected for the data block.

Next, at 750, the data block is stored into a group corresponding to rewriting period E0. For example, in the above example, a data block with an average rewriting time of three days will be stored in group E2 with a rewriting period of one week.

It should be understood that in some embodiments, other rules may also be used to group data blocks in storage system 100. For example, the data blocks may also be grouped by the frequency of rewriting the data blocks in the last few times. The way of grouping data blocks may be arbitrary.

After data is grouped using method 700 according to the rewriting period of the data, the order in which the data blocks are removed from local storage device 101 may be determined according to different groups of the data blocks. For example, FIG. 8 shows a schematic diagram of selectively removing data according to a rewriting period of the data according to some embodiments of the present disclosure.

During use, a storage space of local storage device 101 is often insufficient. When the storage space of local storage device 101 is insufficient, a data block in local storage device 101 needs to be removed so that subsequent data blocks can be stored in local storage device 101 later. In the process of removing the data blocks in local storage device 101, the data blocks stored in local storage device 101 are selectively removed through different rewriting periods. In some embodiments, the data blocks in local storage device 101 may be grouped according to the process shown in FIG. 7, and the data blocks in different groups have different rewriting periods. For example, as shown in FIG. 8, E1 may represent a group with a rewriting period of one month, E2 may represent a group with a rewriting period of one week, . . . , Ek may represent a group with the shortest rewriting period, for example, a group of one hour.

Figure 8:
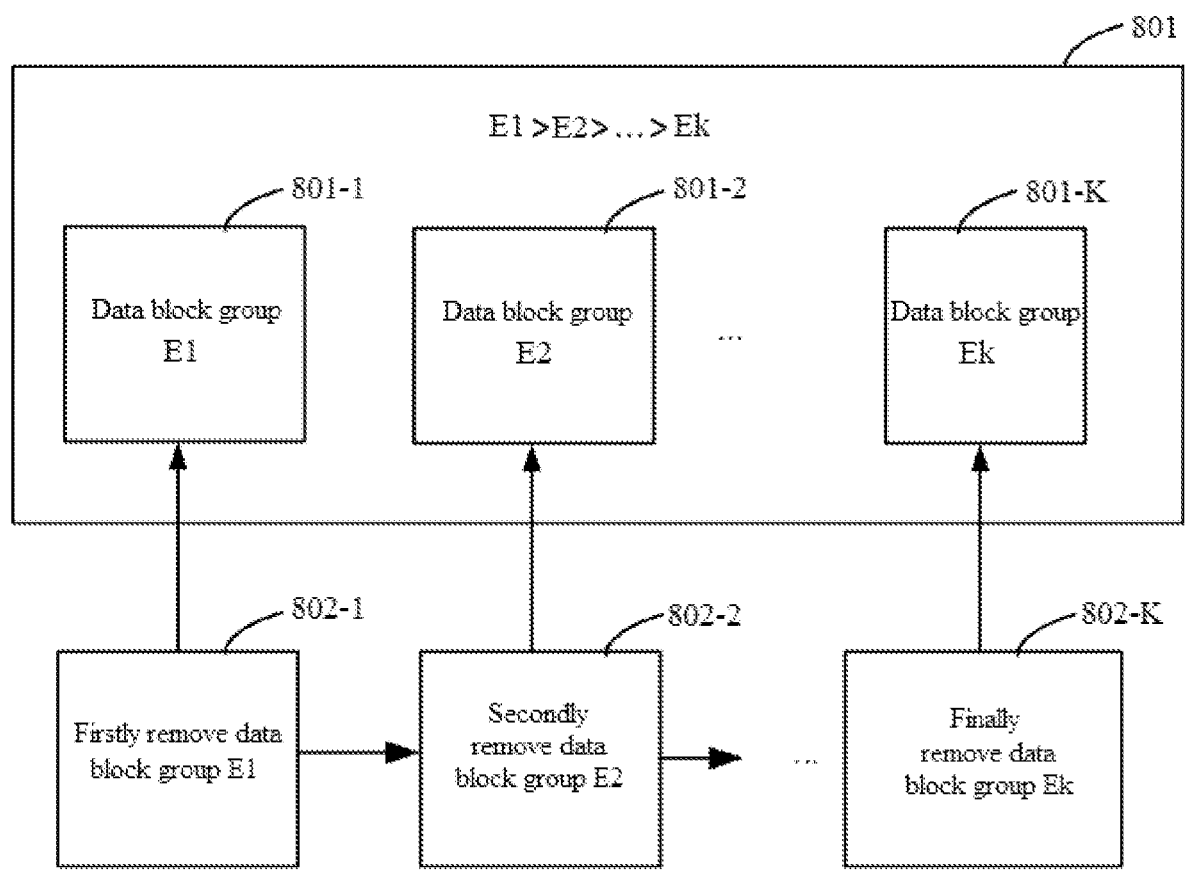
FIG. 8 shows a schematic diagram of removing data according to a rewriting period of the data according to some other embodiments of the present disclosure.

As shown in FIG. 8, storage system 100 will first remove the data blocks in a group with the longest rewriting period E1 in local storage device 101 to release the storage space in local storage device 101. If the storage space in local storage device 101 is still insufficient after removing the data blocks in the group with the longest rewriting period E1, the data blocks in the group with the second longest rewriting period E2 are selected to be removed . . . until the end, and if the storage space in local storage device 101 is still insufficient, the data blocks in the group with the shortest rewriting period Ek will be removed until the available storage space in local storage device 101 is large enough. K in FIG. 8 may be any natural number.

In this way, the data blocks stored in local storage device 101 may be selectively removed according to the rewriting periods of different data blocks, and it may be ensured that the most important data blocks, such as the data blocks with the shortest rewriting period, can be retained in local storage device 101, so data can be better protected. In this way, the efficiency of data backup can be better ensured and costs can be saved.

Figure 9:
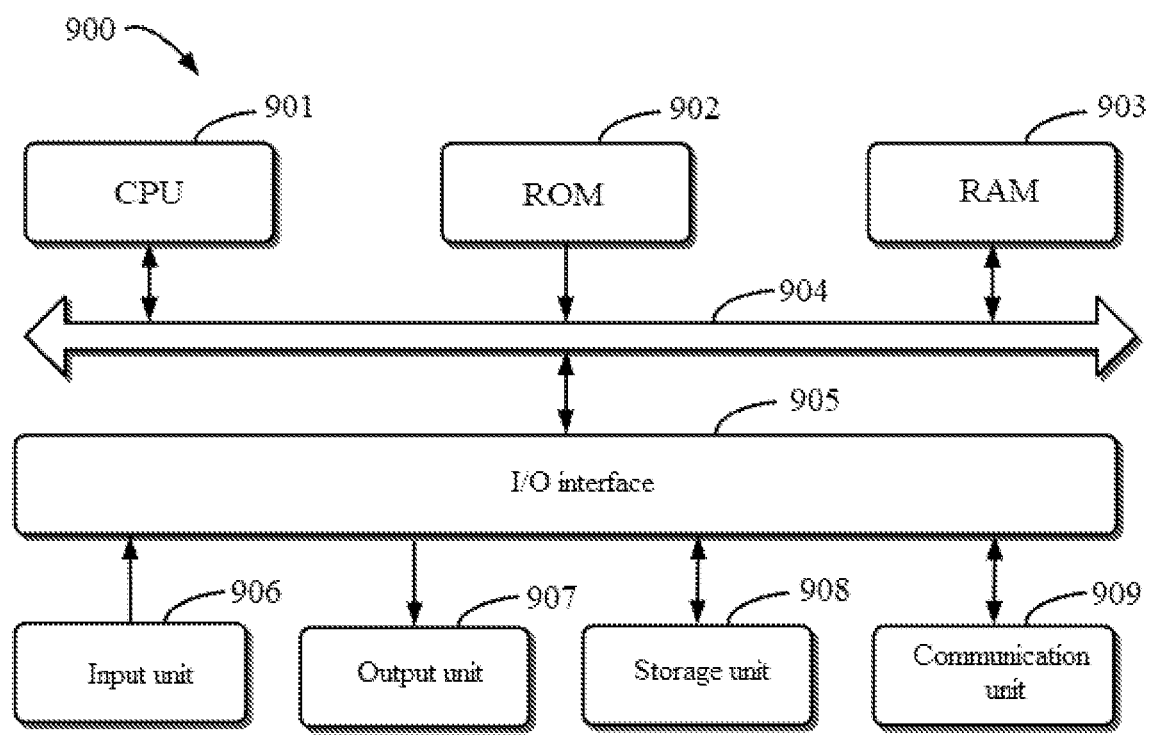
FIG. 9 shows a schematic block diagram of an example device that may be configured to implement embodiments of the present disclosure.

FIG. 9 shows a schematic block diagram of example device 900 that may be configured to implement embodiments of the present disclosure. For example, storage system 100 as shown in FIG. 1 may be implemented by device 900. As shown in FIG. 9, device 900 includes central processing unit (CPU) 901 that may perform various appropriate actions and processing according to computer program instructions stored in read-only memory (ROM) 902 or computer program instructions loaded from storage unit 1008 into random access memory (RAM) 903. Various programs and data required for the operation of device 900 may also be stored in RAM 903. CPU 901, ROM 902, and RAM 903 are connected to one another through bus 904. Input/output (I/O) interface 905 is also connected to bus 904.

Multiple components in device 900 are connected to I/O interface 905, including: input unit 906, such as a keyboard and a mouse; output unit 907, such as various types of displays and speakers; storage unit 908, such as a magnetic disk and an optical disk; and communication unit 909, such as a network card, a modem, and a wireless communication transceiver. Communication unit 909 allows device 900 to exchange information/data with other devices through a computer network such as the Internet and/or various telecommunication networks.

The various processes and processing described above, for example, methods 200, 400, 500, and/or 700, may be performed by processing unit 901. For example, in some embodiments, methods 200, 400, 500, and/or 700 may be implemented as a computer software program that is tangibly included in a machine-readable medium such as storage unit 908. In some embodiments, part or all of the computer program may be loaded and/or installed onto device 900 via ROM 902 and/or communication unit 909. When the computer program is loaded onto RAM 903 and executed by CPU 901, one or more actions of methods 200, 400, 500, and/or 700 described above may be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions for use by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk drive, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device such as a punch card or a raised structure in a groove having instructions stored thereon, and any suitable combination thereof. Computer-readable storage media used herein are not to be interpreted as transient signals per se, such as radio waves or other freely propagating electromagnetic waves, electromagnetic waves propagating through waveguides or other transmission media (for example, light pulses through fiber optic cables), or electrical signals transmitted via electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. The network adapter card or network interface in each computing/processing device receives computer-readable program instructions from the network and forwards the computer-readable program instructions for storage in a computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source or object code written in any combination of one or more programming languages, wherein the programming languages include object-oriented programming languages, such as Smalltalk and C++, and conventional procedural programming languages, such as the "C" language or similar programming languages. Computer-readable program instructions may be executed entirely on a user's computer, partly on a user's computer, as a stand-alone software package, partly on a user's computer and partly on a remote computer, or entirely on a remote computer or a server. In the case involving a remote computer, the remote computer can be connected to a user's computer through any kind of network, including a local area network (LAN) or a wide area network (WAN), or it can be connected to an external computer (for example, connected through an Internet using an Internet service provider). In some embodiments, an electronic circuit, for example, a programmable logic circuit, a field programmable gate array (FPGA), or a programmable logic array (PLA), is personalized by utilizing state information of the computer-readable program instructions, wherein the electronic circuit may execute computer-readable program instructions so as to implement various aspects of the present disclosure.

Various aspects of the present disclosure are described herein with reference to flowcharts and/or block diagrams of the method, the apparatus (system), and the computer program product according to embodiments of the present disclosure. It should be understood that each block in the flowcharts and/or block diagrams as well as a combination of blocks in the flowcharts and/or block diagrams may be implemented by using the computer-readable program instructions.

These computer-readable program instructions can be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing the functions/actions specified in one or more blocks in the flowcharts and/or block diagrams. These computer-readable program instructions may also be stored in a computer-readable storage medium, and these instructions cause a computer, a programmable data processing apparatus, and/or other devices to work in a specific manner; and thus the computer-readable medium having stored instructions includes an article of manufacture including instructions that implement various aspects of the functions/actions specified in one or more blocks in the flowcharts and/or block diagrams.

The computer-readable program instructions can also be loaded onto a computer, a further programmable data processing apparatus, or a further device, so that a series of operating steps can be performed on the computer, the further programmable data processing apparatus, or the further device to produce a computer-implemented process, such that the instructions executed on the computer, the further programmable data processing apparatus, or the further device can implement the functions/actions specified in one or more blocks in the flowcharts and/or block diagrams.

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, the module, the program segment, or the part of an instruction including one or more executable instructions for implementing specified logical functions. In some alternative implementations, the functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flowcharts as well as a combination of blocks in the block diagrams and/or flowcharts may be implemented by using a special hardware-based system for executing specified functions or actions or by a combination of special hardware and computer instructions.

The embodiments of the present disclosure have been described above. The above description is illustrative, rather than exhaustive, and is not limited to the disclosed embodiments. Numerous modifications and alterations are apparent to those of ordinary skill in the art without departing from the scope and spirit of illustrated various embodiments. The selection of terms used herein is intended to best explain the principles and practical applications of the embodiments or the improvements to technologies on the market, or to enable other persons of ordinary skill in the art to understand the embodiments disclosed herein.

The invention claimed is:

1. A method for managing a storage system, comprising:
storing a data block to be backed up into a local storage device of the storage system;
determining whether the data block comprises periodically rewritten data based on historical operation information of the storage system, the historical operation information being associated with storage operations and removal operations by the storage system on historical data; and
if it is determined that the data block does not comprise periodically rewritten data,
storing the data block into a remote storage device of the storage system, and
removing the data block from the local storage device.

2. The method according to claim 1, wherein the determining whether the data block comprises periodically rewritten data comprises:
determining, based on the historical operation information and using a neural network model, an instruction associated with rewriting of historical data corresponding to the data block, the rewriting comprising a storage operation and a removal operation; and
if the instruction exceeds a threshold, determining that the data block comprises periodically rewritten data.

3. The method according to claim 2, wherein the instruction comprises at least one of the following:
the number of times that the historical data corresponding to the data block is repeatedly removed and stored,
a frequency at which the historical data corresponding to the data block is repeatedly removed and stored,
a variance of time intervals at which the historical data corresponding to the data block is repeatedly rewritten, the rewriting time intervals referring to time intervals between the time when the historical data is removed and the time when the historical data is first stored after the removal time, and
an average time interval of the time intervals at which the historical data corresponding to the data block is repeatedly rewritten.

4. The method according to claim 1, further comprising:
in response to removing the data block from the local storage device,
storing a hash value of the data block in a historical removal record of the storage system, the historical removal record being associated with the removal operation for the data block;
determining whether the historical operation information of the storage system comprises a historical record corresponding to the hash value of the data block;
if it is determined that the historical operation information does not comprise a historical record corresponding to the hash value, adding a historical record corresponding to the hash value to the historical operation information, and recording the hash value and a removal operation type of the data block and the time when the data block is removed into the historical record; and if it is determined that the historical operation information comprises the historical record corresponding to the hash value, recording a removal operation type of the data block and the time when the data block is removed into the historical record.

5. The method according to claim 4, further comprising:

in response to storing the data block into the local storage device, determining whether the hash value of the data block is stored in the historical removal record; and if it is determined that the hash value of the data block is stored in the historical removal record, recording a storage operation type of the data block and the time when the data block is stored in the historical record, corresponding to the hash value, in the historical operation information.

6. The method according to claim 1, further comprising:

in response to an insufficient storage space of the local storage device, determining a plurality of data blocks stored in the local storage device, the plurality of data blocks having different rewriting periods; and removing a data block corresponding to the longest rewriting period among the plurality of data blocks from the local storage device.

7. A non-volatile computer-readable medium comprising machine-executable instructions, which when executed by a processor, cause the processor to perform actions, the actions comprising:

storing a data block to be backed up into a local storage device of the storage system;

determining whether the data block comprises periodically rewritten data based on historical operation information of the storage system, the historical operation information being associated with storage operations and removal operations by the storage system on historical data; and if it is determined that the data block does not comprise periodically rewritten data, storing the data block into a remote storage device of the storage system, and removing the data block from the local storage device.

8. The computer-readable medium according to claim 7, wherein the determining whether the data block comprises periodically rewritten data comprises:

determining, based on the historical operation information and using a neural network model, an instruction associated with rewriting of historical data corresponding to the data block, the rewriting comprising a storage operation and a removal operation; and If the instruction exceeds a threshold, determining that the data block comprises periodically rewritten data.

9. The computer-readable medium according to claim 8, wherein the instruction comprises at least one of the following:

the number of times that the historical data corresponding to the data block is repeatedly removed and stored, a frequency at which the historical data corresponding to the data block is repeatedly removed and stored, a variance of time intervals at which the historical data corresponding to the data block is repeatedly rewritten, the rewriting time intervals referring to time intervals between the time when the historical data is removed and the time when the historical data is first stored after the removal time, and an average time interval of the time intervals at which the historical data corresponding to the data block is repeatedly rewritten.

10. The computer-readable medium according to claim 7, wherein the actions further comprise:

in response to removing the data block from the local storage device, storing a hash value of the data block in a historical removal record of the storage system, the historical removal record being associated with the removal operation for the data block;

determining whether the historical operation information of the storage system comprises a historical record corresponding to the hash value of the data block;

if it is determined that the historical operation information does not comprise a historical record corresponding to the hash value, adding a historical record corresponding to the hash value to the historical operation information, and recording the hash value and a removal operation type of the data block and the time when the data block is removed into the historical record; and if it is determined that the historical operation information comprises the historical record corresponding to the hash value, recording a removal operation type of the data block and the time when the data block is removed into the historical record.

11. The computer-readable medium according to claim 10, wherein the actions further comprise:

in response to storing the data block into the local storage device, determining whether the hash value of the data block is stored in the historical removal record; and if it is determined that the hash value of the data block is stored in the historical removal record, recording a storage operation type of the data block and the time when the data block is stored in the historical record, corresponding to the hash value, in the historical operation information.

12. The computer-readable medium according to claim 7, wherein the actions further comprise:

in response to an insufficient storage space of the local storage device, determining a plurality of data blocks stored in the local storage device, the plurality of data blocks having different rewriting periods; and removing a data block corresponding to the longest rewriting period among the plurality of data blocks from the local storage device.

13. An electronic device, comprising:

at least one processor; and at least one memory storing computer program instructions, which when executed by the at least one processor, cause the electronic device to perform actions, the actions comprising:

storing a data block to be backed up into a local storage device of a storage system;

determining whether the data block comprises periodically rewritten data based on historical operation information of the storage system, the historical operation information being associated with storage operations and removal operations by the storage system on historical data; and if it is determined that the data block does not comprise periodically rewritten data, storing the data block into a remote storage device of the storage system, and removing the data block from the local storage device.

14. The electronic device according to claim 13, wherein the determining whether the data block comprises periodically rewritten data comprises:
 determining, based on the historical operation information and using a neural network model, an instruction associated with rewriting of historical data corresponding to the data block, the rewriting comprising a storage operation and a removal operation; and
 if the instruction exceeds a threshold, determining that the data block comprises periodically rewritten data.

15. The electronic device according to claim 14, wherein the instruction comprises at least one of the following:
 the number of times that the historical data corresponding to the data block is repeatedly removed and stored,
 a frequency at which the historical data corresponding to the data block is repeatedly removed and stored,
 a variance of time intervals at which the historical data corresponding to the data block is repeatedly rewritten, the rewriting time intervals referring to time intervals between the time when the historical data is removed and the time when the historical data is first stored after the removal time, and
 an average time interval of the time intervals at which the historical data corresponding to the data block is repeatedly rewritten.

16. The electronic device according to claim 13, wherein the actions further comprise:
 in response to removing the data block from the local storage device,
 storing a hash value of the data block in a historical removal record of the storage system, the historical removal record being associated with the removal operation for the data block;
 determining whether the historical operation information of the storage system comprises a historical record corresponding to the hash value of the data block;
 if it is determined that the historical operation information does not comprise a historical record corresponding to the hash value, adding a historical record corresponding to the hash value to the historical operation information, and recording the hash value and a removal operation type of the data block and the time when the data block is removed into the historical record; and
 if it is determined that the historical operation information comprises the historical record corresponding to the hash value, recording a removal operation type of the data block and the time when the data block is removed into the historical record.

17. The electronic device according to claim 16, wherein the actions further comprise:
 in response to storing the data block into the local storage device, determining whether the hash value of the data block is stored in the historical removal record; and
 if it is determined that the hash value of the data block is stored in the historical removal record, recording a storage operation type of the data block and the time when the data block is stored in the historical record, corresponding to the hash value, in the historical operation information.

18. The electronic device according to claim 13, wherein the actions further comprise:
 in response to an insufficient storage space of the local storage device, determining a plurality of data blocks stored in the local storage device, the plurality of data blocks having different rewriting periods; and
 removing a data block corresponding to the longest rewriting period among the plurality of data blocks from the local storage device.

* * * * *